United States Patent [19]

Marthaler et al.

[11] Patent Number: 4,738,060
[45] Date of Patent: Apr. 19, 1988

[54] PERMANENT MARKER FOR UTILITIES

[76] Inventors: Gregory A. Marthaler, 1969 Dorset Dr., Wheaton, Ill. 60187; Robert H. Marthaler, 942 Sycamore La., Bartlett, Ill. 60103

[21] Appl. No.: 939,353

[22] Filed: Dec. 8, 1986

[51] Int. Cl.⁴ .......................................... E04H 13/00
[52] U.S. Cl. ...................................... 52/103; 52/153; 52/163; 135/118
[58] Field of Search .............. 52/103, 104, 105, 153, 52/155, 163; 135/118

[56] References Cited

U.S. PATENT DOCUMENTS

| | | | |
|---|---|---|---|
| 429,650 | 6/1890 | Scott | 52/103 |
| 2,038,962 | 4/1936 | Schulthess | 52/155 |
| 3,688,454 | 9/1972 | Wolfcarius | 52/103 |
| 4,185,424 | 1/1980 | Streit | 52/153 |

FOREIGN PATENT DOCUMENTS

| | | | |
|---|---|---|---|
| 2363766 | 3/1975 | Fed. Rep. of Germany | 52/103 |
| 17977 | of 1909 | United Kingdom | 135/118 |

Primary Examiner—James L. Ridgill, Jr.

[57] ABSTRACT

A marker assembly for permanently locating underground utility elements with a non-removable plastic stake and a tamper-proof marker held in place by the stake.

10 Claims, 3 Drawing Sheets

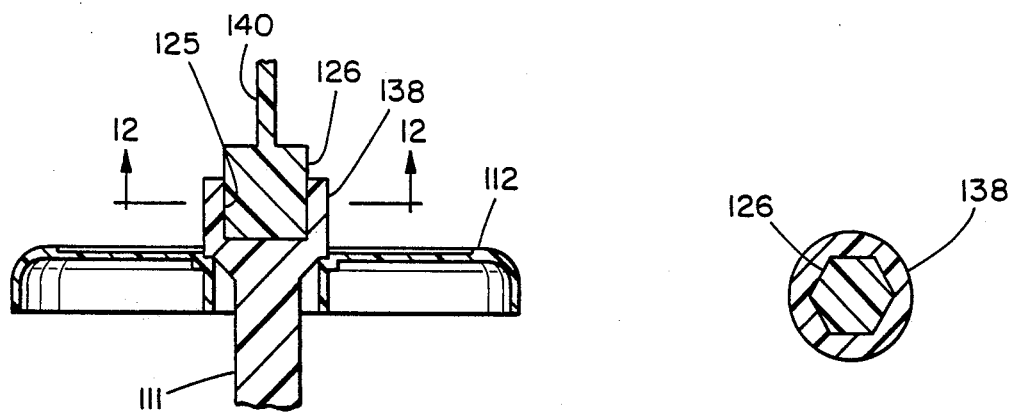
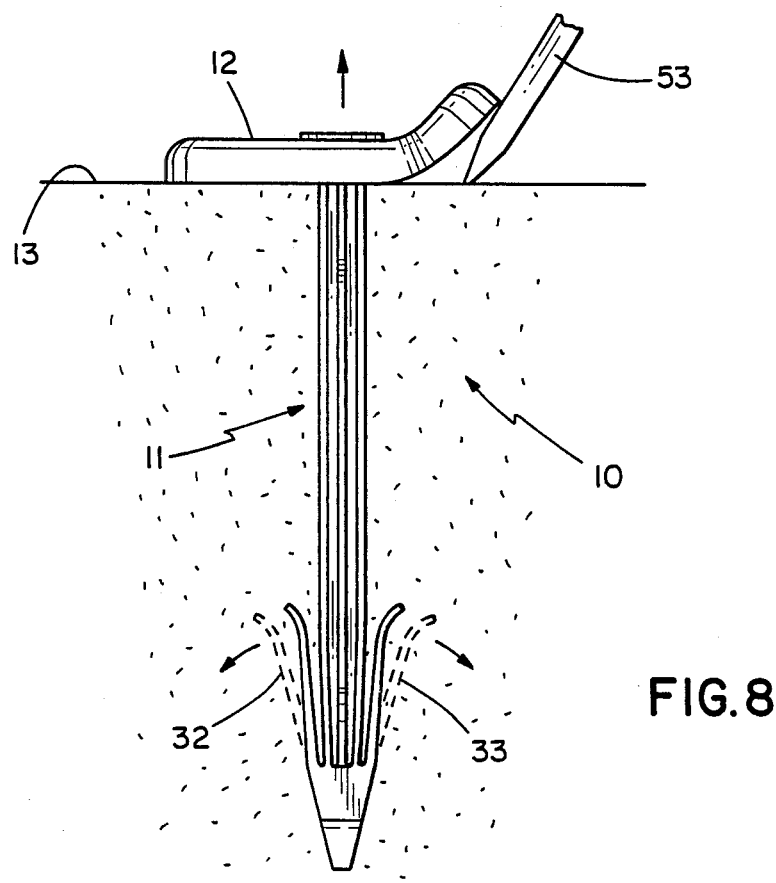
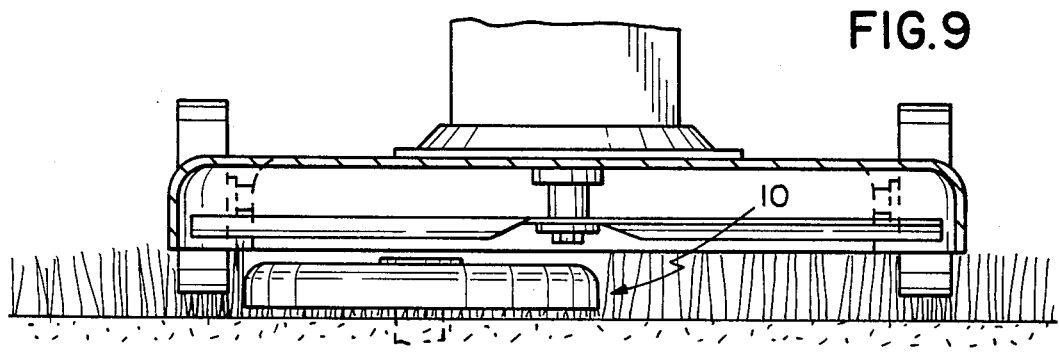

PERMANENT MARKER FOR UTILITIES

BACKGROUND OF THE INVENTION

One of the significant problems in the underground implantation of utility elements, such as telephone lines and electric power lines, is the accurate and reliable marking of the location of these elements to prevent damage to the element by others disturbing the ground in the area and even damage in some cases caused by the utilities' own employess digging too close to the underground elements. This problem is magnified where the buried utility is fragile, such as in underground fiber optic telephone transmission lines.

The comon practice today is that before disturbing the ground in an area suspected to contain underground utilities, the contractor contacts the subject utility and someone from that utility responds by coming out to the area and temporarily marking the location of its buried elements with paint usually from a commmon paint spray can or temporary stakes and pennants. This procedure has many disadvantages, one being that it is costly for the utility to employ marker people for this purpose because such marking requests are very frequent. Furthermore, it is not always possible for the marking person to accurately mark the location of the buried element either because of his or her own errors or due to errors in the location drawing that he has used as a guide.

For these reasons it has for many years been desirable to design a utility marking system that is permanent, rather than temporary, since this permits accurate marking of the location of underground elements if the marker is installed at the time of original utility element ground implantation because its correct location is easily physically ascertainable then without resort to any locating maps. However, because these so-called "permanent" markers are subject to theft, vandalism and damage resulting from ground moving equipment, they have not proved permanent at all and, therefore, have not been used extensively by the utility companies.

It is a primary object of the present invention to provide a marker assembly that will ameliorate the problems noted above in marking underground utilities.

SUMMARY OF THE PRESENT INVENTION

In accordance with the present invention a permanent marker assembly is provided for indicating underground utility elements that includes a non-removable, hammer drivable plastic stake that holds a tamper-proof marker in position close to the ground surface.

Toward this end the present marker assembly includes a one-piece injection moldable high impact strength plastic stake having an integral hammer impacting head at one end and two integral plastic flexible barbs at its point end that prevent removal of the stake from the ground. The stake has a generally rectangular cross-section that prevents rotation of the stake relative to the ground.

The marker is a shallow cup-shaped one-piece plastic molding that has directional arrows molded on its upper surface that cannot be removed. This marker has relatively thin walls and is constructd of an elastomeric plastic having a Shore A durometer of approximately 90, so that if anyone attempts to pry the marker upwardly from the ground, it will simply bend over the top of the stake and spring back to its ground position when released. This not only prevents permanent damage to the marker but also prevents stake removal by prying on the marker.

The marker has a generally rectangular opening that slidably and non-rotatably receives the stake so that the direction of the arrows on the marker remain unchanged over time relative to the ground surface.

Prior to implantation, the stake is assembled to the marker by sliding the point of the stake through the rectangular marker slot which compresses the barbs on the stake inwardly. Then the stake is driven into the ground by hammering the head of the stake making certain to drive the stake into the ground at an angular orientation so that the utility indicating arrows point in the correct direction since the direction cannot be changed thereafter. The flexible barbs on the stake point prevent removal of the stake, and the head of the stake prevents removal of the marker from the stake. The low profile of the marker easily permits equipment to pass thereover, such as mowing equipment, without damaging the marker or the stake.

Other objects and advantages of the present invention will appear more clearly from the following detailed description of the invention.

BRIEF DESCRIPTION OF THE DRAWINGS

FIG. 8 is a front view of the marker assembly illustrated in FIG. 3, showing ground implanted with a prying implement attempting to pry the underside of the marker sub-assembly;

FIG. 9 is a view of an implanted marker assembly according to the present invention with a lawn mower passing freely thereover;

FIG. 11 is a fragmentary longitudinal section of the marker illustrated in FIG. 10; and FIG. 12 is a cross-section showing the interconnection between the secondary marker and the stake taken generally along line 12—12 of FIG. 11.

DETAILED DESCRIPTION OF THE PREFERRED EMBODIMENTS

Figure 1:
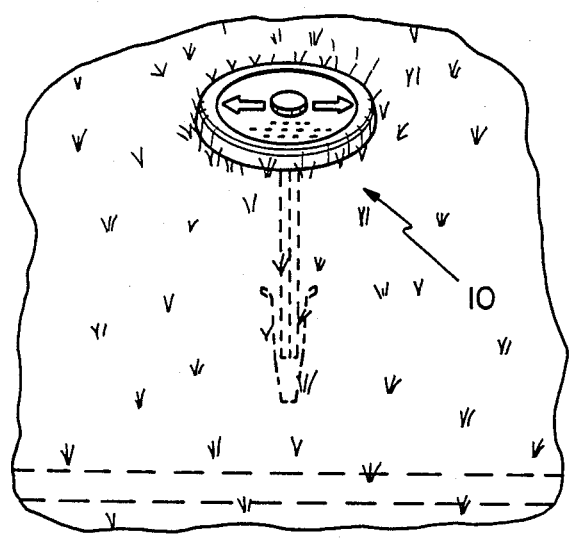
FIG. 1 is a perspective view of the present marker assembly shown implanted in the ground.
Figure 2:
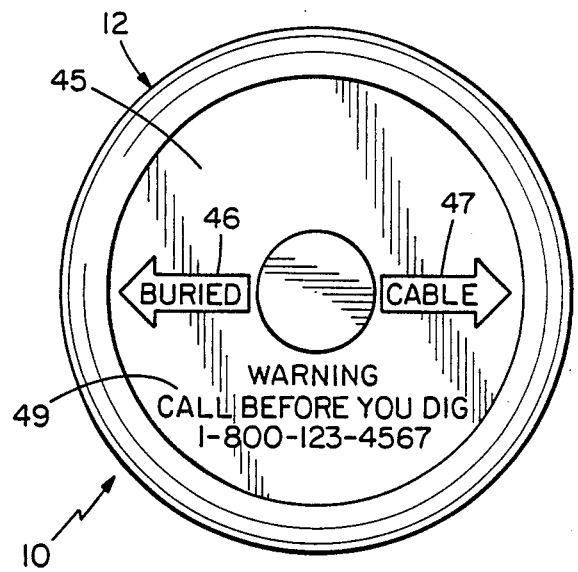
FIG. 2 is an enlarged top view of the present marker assembly.
Figure 3:
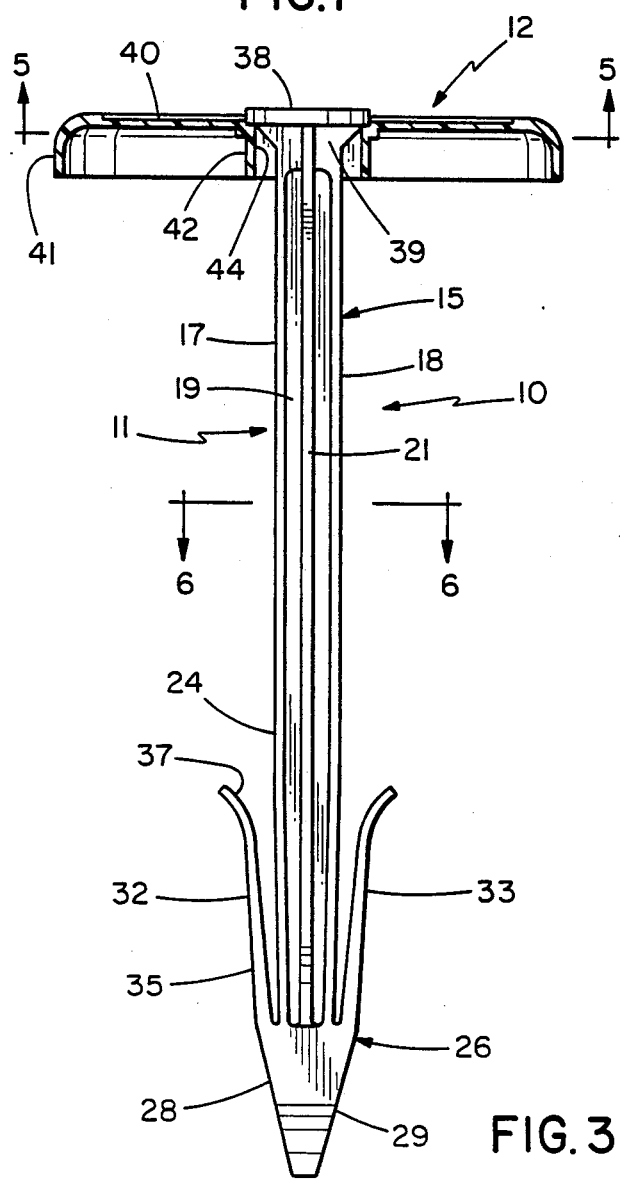
FIG. 3 is a front view of the marker assembly illustrated in FIGS. 1 and 2 with the marker shown in cross-section.
Figure 4:
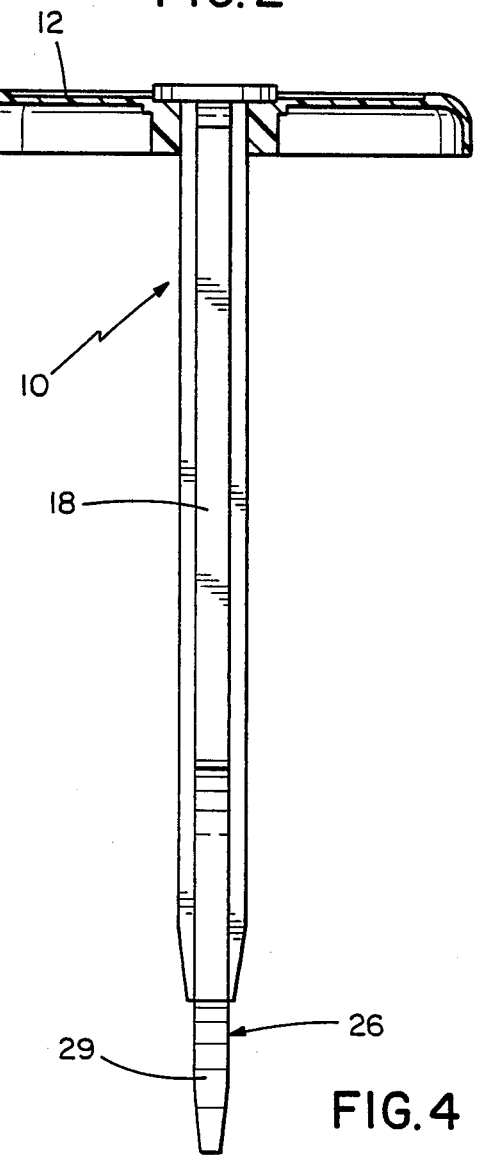
FIG. 4 is a side view of the marker assembly illustrated in FIG. 3.

Referring to the drawings and particularly FIGS. 1 to 9, a marker assembly 10 is illustrated consisting generally of a one-piece plastic stake 11 that holds a one-piece plastic marker 11 permanently in position against ground upper surface 13, both axially and rotationally.

The stake 11 is a one-piece plastic molding constructed of either a high impact Delrin or Styrene.

Figure 6:
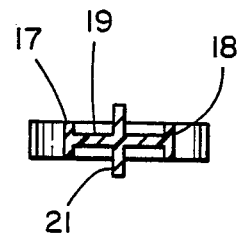
FIG. 6 is a cross-section of the marker shank taken generally along line 6—6 of FIG. 3.

Stake 11 includes a straight shank portion 15, having a generally rectangular cross-section as shown in FIG. 6, with spaced flanges 17 and 18 interconnected by a web 19, with a central cross flange 21 extending parallel to the flanges 17 and 18. The flanges 17 and 18 converge slightly at the forward end of the stake beginning approximately at point 24, and terminate in a point 26, having a rectangular cross-section with forwardly converging walls 28 and 29. The point 26 has a pair of rearwardly extending flexible barbs 32 and 33, having straight rearwardly and outwardly directed flexible portions 35, each ending in an arcuate gripping portion 37.

Figure 5:
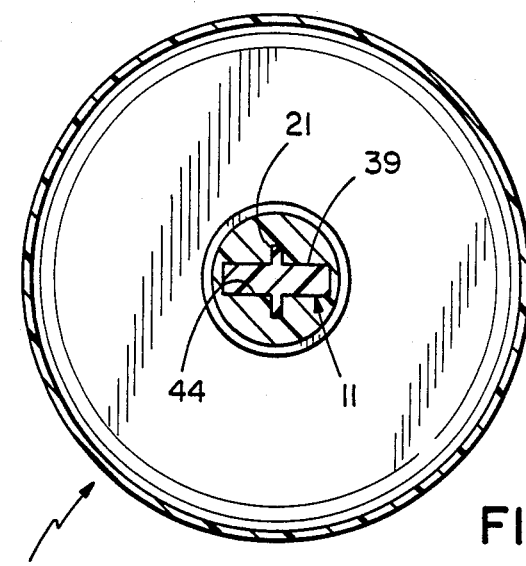
FIG. 5 is a cross-section of the marker assembly illustrating the interconnection between the marker and the stake taken generally along line 5—5 of FIG. 3.

The rear end of the stake 11 has an integral impact receiving cylindrical head 38 formed on top of a central solid rectangular web 39 and cross web 21 (See FIG. 5).

The stake 11 holds the marker 12 in position on ground surface 13, and the marker is a one-piece plastic molding, preferably constructed of a high impact flexible thermoplastic material such as a vinyl acetate with an elongation of 750% and a Shore A durometer of approximately 90. One such plastic that has been found suitable is Dupont Corporation's Elvax TM 460.

The marker 14 is shaped generally as a shallow cup and includes a relatively thin top wall 40 that curves into an annular peripheral wall 41 with a central boss 42, having a generally rectangular opening 44 therethrough that is complementary in shape to the cross-section of the stake shank portion 15 immediately beneath the head 38. This complementary relationship of the marker opening 44 and the stake 11 beneath the head 38 prevents relative angular movement between the stake and the marker.

The upper surface or face 45 of the marker 12 has molded directional arrows 46 and 47 therein, as well as warning and telephone information 49 formed by engraving directly into the mold cavities for the marker 12 so that they are permanent and cannot be removed by peeling labels or paint wearing off due to environmental conditions.

The axial length of the marker 12 is less than ¾ inches so that, as seen in FIG. 9, when implanted against the ground by the stake 11, equipment such as lawn mowing equipment, may pass unobstructed thereover.

Figure 7:
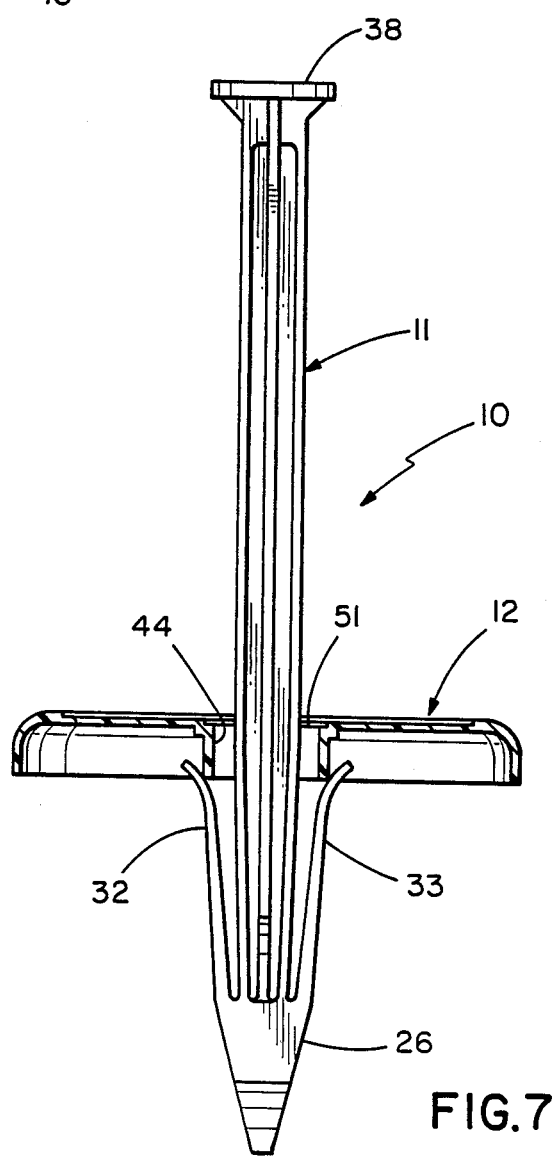
FIG. 7 is a front view of the marker assembly illustrated in FIG. 3, showing the slidable relation between the marker sub-assembly and the stake.

The marker assembly 10 is preferably ground implanted when the underground utility is originally installed to accurately locate the utility elements, such as buried cables. The assembly is installed by inserting stake point 26 through marker aperture 44 sliding the stake forwardly through the aperture. Aperture 44 cams the flexible barbs 32 and 33 radially inwardly during this movement so that they pass through aperture 44. After passing through aperture 44 the barbs 32 and 33 spring outwardly to the position illustrated in FIG. 7. With the marker assembled to the stake as shown in FIG. 7, a hammer is utilized to drive the stake into the ground by impacting stake head 38 until the head 38 seats itself in an annular counterbore 51 in the upper surface of marker boss 42.

As seen in FIG. 8, the shape of the flexible barbs 32 and 33 and particularly curved ends 37 tend to force the barbs radially outwardly to the dotted line positions illustraed upon attempted removal of the stake or marker 11, making removal more difficult, and thus the present marker is permenently implanted into the ground. The marker 12 has sufficient flexibility and sufficiently thin walls so that in the event anyone attempts to pry the marker upwardly with an implement such as prying implement 53 in FIG. 11, the marker 12 will simply bend harmlessly upwardly without breaking or pulling the stake 11 upwardly.

Figure 10:
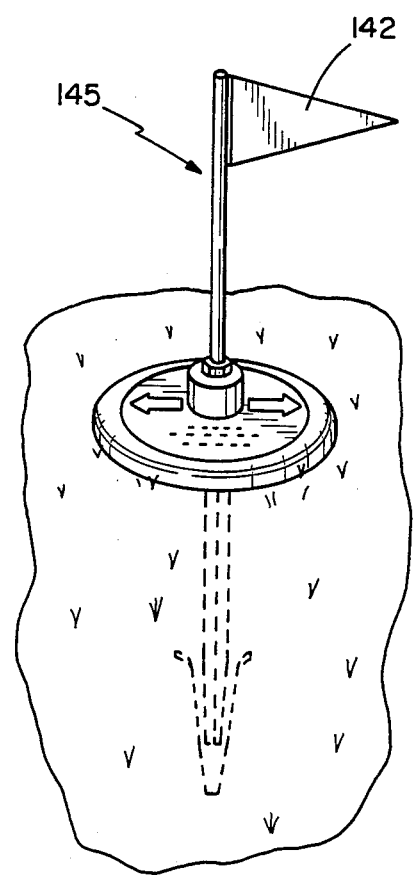
FIG. 10 is a perspective view of a modified form of the present marker assembly adapted to receive a secondary vertical marker.

An alternate embodiment of the present invention is illustrated in FIGS. 10 to 12, and in this embodiment, a stake 111 is provided identical to stake 11 illustrated in FIGS. 1 to 9, except that head portion 138 extends upwardly approximately one inch above marker 112 and has a hexagonal socket 125 formed therein that releasably receives a hexagonal boss 126 formed integrally with a flexible staff 140 that holds a locating device such as a small pennant 142 illustrated in FIG. 10. The boss 126, staff 140 and pennant 142 form a secondary marker 45 that is adapted to be temporarily utilized to identify either the location of the marker assembly and/or the location of the underground utility element, particularly for distance sitings.

What is claimed is:

1. A ground marker assembly for indicating the location of buried objects comprising: a ground penetrating stake having an integral impacting head at one end thereof and an integral non-removable point at the other end thereof with outwardly projecting integral flexible barbs thereon, a generally flat marker having directional indicia on the surface thereof indicating the location of the buried object, said marker having a stake rceiving opening therethrough that engages and compresses the barbs on the stake permitting the stake to pass through the marker so the marker can be assembled to the stake prior to driving the stake in the ground, and interengaging means on the stake and the marker to prevent relative rotation there-between whereby the position of the directional indicia relative to the ground remains unchanged.

2. A ground marker assembly for indicating the location of buried objects, as defined in claim 1, wherein the marker is constructed of a sufficiently flexible elastomeric material that after ground implantation it will bend upwardly easily preventing the stake from being pried upwardly by a prying implement without bending.

3. A ground marker assembly for indicating the location of buried objects, comprising: a ground penetrating stake having an integral impacting head at one end thereof and an integral non-removable point at the other end thereof with integral barbs projecting therefrom, said stake being constructed of plastic and having a generally rectangular cross-section and a marker constructed of flexible plastic and having a generally rectangular opening therethrough slidably receiving the stake, said stake head being sufficiently large to prevent removal of the marker from the stake across the stake head, said rectangular opening in the marker preventing relative rotation of the marker and the stake, said rectangular cross-section of the stake preventing relative rotation of the stake to the ground, said point on the stake having integral flexible barbs that prevent removal of the stake from the ground after implantation, said opening in the marker being constructed to compress the stake barbs as the stake passes through the marker opening.

4. A ground marker assembly for indicating the location of buried objects, as defined in claim 3, including directional indicia integrally formed on the marker to indicate the location of the buried object.

5. A ground marker assembly for indicating the location of buried objects, as defined in claim 4, wherein the stake is a one-piece plastic molding.

6. A ground marker assembly for indicating the location of buried objects, as defined in claim 4, including a second marker receiving opening in the head of the stake adapted to receive a vertically extending second marker.

7. A ground marker assembly for indicating the location of buried objects, as defined in claim 4, wherein the marker is cup-shaped having a diameter far greater than its height so that it lays close to the ground and permits mowing or other equipment to pass thereover unobstructed.

8. A ground marker assembly for indicating the location of buried objects, as defined in claim 7, wherein the marker is thin walled and molded plastic having a Shore A durometer in the range of 75 to 100.

9. A ground marker assembly for indicating the location of buried objects comprising a one-piece plastic stake including an elongated shank portion having a hammer impacting integral head at one end thereof and an integral ground penetrating point at the other end and including a plurality of outwardly and rearwardly projecting flexible integral barbs that when implanted prevent removal of the stake, and a locating marker slidably received on the stake and prevented from removal therefrom by the stake head.

10. A ground marker assembly for indicating the location of buried objects, as defined in claim 9, wherein the marker has an opening therethrough that slidably receives the stake, said point barbs being wider than the marker opening but sufficiently flexible so they can be compressed for insertion of the point through the opening as the marker is assembled to the stake.

* * * * *